United States Patent Office 3,453,188
Patented July 1, 1969

3,453,188
ELECTROCHEMICAL ACYLOXYLATION PROCESS
Arthur M. Brownstein, Morristown, N.J., assignor to Princeton Chemical Research, Inc., Princeton, N.J., a corporation of New Jersey
No Drawing. Filed Oct. 19, 1966, Ser. No. 587,663
Int. Cl. C07c 41/00, 67/00; B01k 1/00
U.S. Cl. 204—72          11 Claims This invention relates to the production of various olefinically unsaturated compounds. It further refers to a process for producing intermediates useful in the production of olefinically unsaturated compounds.

It is known that compounds having the general formula:

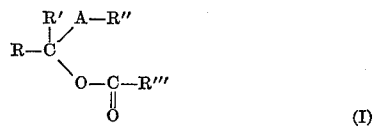

(I)

wherein the R, R' and R" substituents are substantially any noninterfering organic residue, and R may in addition be hydrogen, and wherein A is either oxygen or sulfur, can be pyrolized to cleave a carboxylic acid group therefrom and, provided that the R-substituent has a labile hydrogen atom substituent on its carbon atom bonded to the carbon atom of the general Formula I, produce an olefinically unsaturated compound of the formula:

(II)

It will be appreciated that compounds of the general Formula II are extremely valuable to industry as intermediates for the formation of polymers having themselves various well known uses. Thus, for example, vinyl acetate or vinyl ethyl ether both correspond to Formula II, and these compounds can be prepared by known pyrolysis techniques from their corresponding reactants of Formula I. One specific example of this known pyrolysis is the production of vinyl acetate by the pyrolysis of ethylidene diacetate.

This specifically identified pyrolysis process has, until very recently, been one of the principal industrial processes for the production of commercial quantities of vinyl acetate. More recently, the tendency has been to replace or augment pyrolysis production of vinyl acetate with a direct oxidative coupling reaction for the reason that this newer process is considerably more economical, particularly where large production is contemplated and reasonably priced ethylene is available.

Despite the economics of the above-referred to oxidative coupling process, it is still considered that pyrolysis of alkylidene-type compounds represents a valuable route to the production of olefinically unsaturated compounds. It is therefore considered to be desirable to improve the pyrolysis process for the production of olefin ethers, esters and their sulfur analogues, as much as possible.

In recent years, increased attention has been given to electrolytic reactions as being economical routes by which to produce various chemical compounds. By way of example of this attention, there can be cited the electrolytic oxidative coupling of acrylonitrile to produce adiponitrile. Further, phenol is known to be capable of production by electrolytic acetoxylation.

It is generally known that in the laboratory, the electrolysis of aromatic compounds in acetic acid-sodium acetate mixtures leads to the formation of aryl acetates. Thus, electrolysis of anosole yields 2- and 4-acetoxyanisole as products. Unfortunately, the yields of acetoxylated materials are generally low because di- and triacetoxylation readily occurs, which leads to the formation of substantial amounts of tarry by-products.

It is therefore an object of this invention to provide a novel process for the production of olefinically unsaturated aliphatic compounds.

It is another object of this invention to provide a novel process for the production of pyrolyzable chemical intermediates.

It is a further object of this invention to provide a process for the production of alkylidene esters, etheresters or their sulfur analogues.

It is still another object of this invention to provide a process for the production of unsaturated aliphatic carbonates.

Other and additional objects of this invention will become apparent from a consideration of this entire specification, including the claims appended hereto.

In accord with and fulfilling these objects, one aspect of this invention resides in an electrolytic process for the production of compounds of the formula:

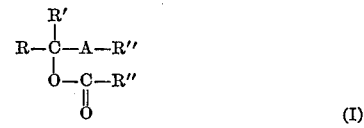

(I)

wherein R and R' are aliphatic compound residues, R" and R''' are organic compound residues, and R may in addition be hydrogen, and A is oxygen or sulfur.

The raw materials from which the compounds of Formula I are prepared are suitably salts of carboxylic acids and aliphatic ethers, esters, carbonates, or their sulfur analogues, wherein the carbon atom bonded to the linking oxygen or sulfur atom has a labile hydrogen atom thereon.

The carboxylic acid salts according to this invention are suitably alkali or alkaline earth metal salts. These metals are exemplified by lithium, potassium, sodium, calcium, magnesium, rubidium, cesium, strontium, barium, and radium. For reasons of economy, it is preferred to use the more common, lower molecular weight metals such as sodium, potassium, lithium, magnesium, and calcium.

The acyloxy moiety of the acid salt is the residue of a carboxylic acid of substantially unlimited chain length. By reason of economic availability, it is suitable to use any of the various fatty acids having up to about 22 carbon atoms. Naturally occurring and/or synthetically produced acids may be used. It is preferred in the practice of this invention that the acids are water-soluble, since this property facilitates salt production. Where practical or desirable, the acid may have substituent molecules attached thereto such as, for example, oxygen in the form of a carbonyl group, as exemplified by acetyl acetic acid.

It will be appreciated that the acid or acid salt represents a recycled or recyclable moiety in the production of olefins by the practice of this invention, since the acyloxylated derivative produced by the electrolytic process described herein is subject to pyrolysis to produce the desired olefinically unsaturated compound and reconstitute the originally used acid. Thus, it will be appreciated that, while substantially any acid can be used, it is preferred to employ the most readily available and inexpensive carboxylic acid in this process, such as acetic acid. Other acids which could be used include propionic, butyric, octanoic, palmitic, stearic, etc.

As stated above, the reactant to be acyloxylated contains a sulfur or oxygen linking atom therein. Exemplary of these compounds are those of the general formula:

(III)

wherein the R's and A have the same definitions as expressed above in connection with Formula I. It is also contemplated that these general Formulas I or III encompass carbonates of the formula:

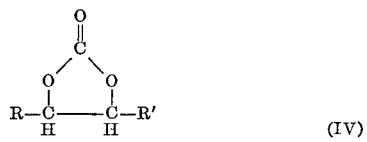 (IV)

in which case R and R' have the same definition as stated above, but may in addition both be hydrogen. Carbonates of the formula:

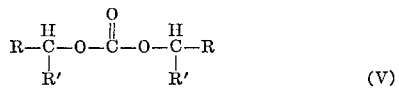 (V)

wherein the R and R' substituents may be the same or different and wherein R and R' have the same definitions as stated above are also contemplated by this invention.

The R-substituents which are not hydrogen and the R'-substituents may be alkyl or cycloalkyl residues. There appears to be no absolute limit on the chain length of these various R-groups. The only limitation appears to be that the alpha-carbon atom of at least one of them must contain an abstractable hydrogen, whereby later pyrolysis of the acyloxylated products can be accomplished to incorporate olefinic unsaturation in the pyrolysis product. If, on the other hand, it is not intended to subject the acyloxylated product to pyrolysis, it is then not essential to provide an abstractable hydrogen on the alpha-carbon atom. Thus, (2,2-dimethyl)-n-propyl ethyl ether can be acetoxylated according to this invention to produce (2,2-dimethyl-1-acetoxy)-n-propyl ethyl ether which cannot be pyrolyzed to its corresponding propenyl derivative; while sec-butyl ethyl ether can be acetoxylated to (1-acetoxy)-sec-butyl ethyl ether which can then be pyrolyzed to sec-buten(1)yl ethyl ether.

R and R' may be exemplified by methyl, ethyl, propyl, cyclohexyl, octyl, dodecyl, stearyl, etc. in normal or isometric configuration. Further, the entire reactant may be a cyclic ether such as tetrahydrofuran, etc. or a lactone such as ε-caprolactone, γ-butyrolactone, δ-valerolactone, etc.; or such ether or lactone having one or more lower alkyl substituents, e.g., $C_1$–$C_6$, thereon, provided that one carbon atom adjacent said linking oxygen atom has at least one abstractable hydrogen thereon.

Carbonate reactants may be exemplified by ethylene carbonate, butylene carbonate, methyl ethyl carbonate, dipropyl carbonate, etc. Suitably, the alcoholic portion of the carbonate ester reactant may have any number of carbon atoms, preferably up to about 22. Where a cyclic carbonate is the reactant, with an ethylene bridge across the carbonate oxygen atoms, the products of pyrolysis of the electrically produced acyloxy-derivative will be substituted or unsubstituted vinylene carbonates.

R'' in the above recited Formulae I and III may be those substituents recited for R and R' exclusive of hydrogen.

Compounds in which the hetero-bridging atom is sulfur include thioethers such as ethyl thioether, diisopropyl thioether, ethylisobutyl thioether, etc.

The electrolytic reaction process of this invention is suitably carried out in carboxylic acid solution. While such is not necessary, it is preferred to provide the solvent carboxylic acid as the same moiety as the acyloxylating agent. This is preferred in order to simplify purification and resolution of the reaction mass and the reaction product. This carboxylic acid solvent moiety may be defined and exemplified of similar scope to the definition given above for the acid constituent of the acyloxylating agent.

The concentration of metal carboxylate in the reaction medium is suitably about 0.02 to 5 molar, preferably 0.1 to 1.5 molar. The concentration of the oxygen or sulfur containing reactant is suitably about 0.01 to 10 molar, preferably 0.02 to 5 molar.

The process is carried out at about 0 to 100° C., preferably about 15 to 50° C.; and under substantially any pressure considered desirable. Superatmospheric, atmospheric or vacuum operations are equally well suited to use in this invention.

Electrode current densities for use in the process of this invention are conveniently about 0.001 to 10 amperes per square centimeter, preferably about 0.01 to 4 amperes per square centimeter, with an anodic potential of about 0.1 to 2.5, preferably about 0.5 to 2.0 volts. Alternating or direct current can be used equally as well in this process. The electrodes may be made of substantially any suitably conductive, relatively inert material such as, for example, platinum or nickel.

This invention is illustrated by the following examples, which are not to be construed as being in any manner restricting upon the scope thereof.

Example I

A jacketed glass reactor fitted with 2 platinum electrodes (1.3 cm.$^2$ area) was charged with an acetic acid solution containing 1 molar sodium acetate. The temperature of the solution was adjusted to 20° C., and ethyl ether was added to give an 0.75 molar concentration. Direct current was passed through the system in a manner such that an anode potential of 0.9 to 1.3 volts was maintained and the current density was 3.0 amperes per square centimeter. After 1.5 hours, the passage of current was terminated. Hydrogen was evolved at the cathode during the electrolysis. The reaction mixture was extracted twice with water, and the remaining organic phase was flash evaporated to remove unreacted ether. The residue contained alpha-acetoxy ethyl ether. This was heated at 250° C. over cupric chloride to produce ethyl vinyl ether and acetic acid as distillation products.

Example II

The procedure of Example I was repeated with the modification that 0.9 molar concentration of ethyl acetate was employed in place of ethyl ether. Direct current and an anode potential of 1.3 to 1.5 volts were employed. After 2 hours, alpha-acetoxyethyl acetate was isolated of the following structure:

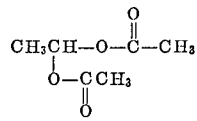

On pyrolysis at 260° C., vinyl acetate was produced in good yield.

Example III

The procedure of Example I was repeated employing a current density of 0.5 ampere per square centimeter and an anode potential of 0.5–0.75 volt. Ethylene carbonate was charged to the acetic acid-sodium acetate system in 0.6 molar concentration. After one hour, alpha-acetoxyethylene carbonate was isolated in good yield. On pyrolysis at 225° C., vinylidene carbonate and acetic anhydride were isolated.

What is claimed is:

1. Acyloxylation process comprising (1) dissolving a first reactant selected from the group consisting of those of the formula:

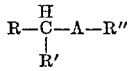

wherein R is a member selected from the group consisting of hydrogen, alkyl and cycloalkyl residues, R' is a member selected from the group consisting of alkyl and cycloalkyl residues, R'' is a member selected from the group consisting of alkyl, cycloalkyl, and

wherein R''' is a member selected from the group consisting of alkyl, aryl and cycloalkyl residues; and where R'' and R' can together with said C and said A form a closed heterocyclic ring, and wherein A is selected from the group consisting of oxygen and sulfur, those of the formula

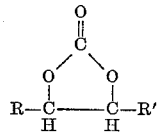

and those of the formula

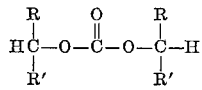

(2) dissolving as a second reactant, a metal salt of a carboxylic acid in an aqueous solution; and (3) passing an electric current through said solution under reaction conditions such that the saturated carbon atom in the alpha-position relative to said A is acyloxylated.

2. Process as claimed in claim 1, carried out at a temperature of about 0 to 100° C., a current density of about 0.001 to 10 amperes per square centimeter and an anodic potential of about 0.1 to 2.5 volts.

3. Process as claimed in claim 1, carried out at a temperature of about 15 to 50° C., a current density of about 0.01 to 4 amperes per square centimeter and an anodic potential of about 0.5 to 2.0 volts.

4. Process claimd in claim 2, wherein said alkyl is at least one member selected from the group consisting of methyl, ethyl, propyl, octyl and stearyl.

5. Process claimed in claim 2, wherein said aryl is at least one member selected from the group consisting of phenyl, naphthyl, biphenyl, and lower alkyl-substituted aryls.

6. Process claimed in claim 2, wherein said first reactant is a member selected from the group consisting of a compound of the formula:

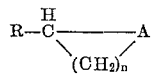

wherein $n$ is a positive integer; and

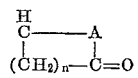

wherein $n$ is a positive integer.

7. Process as claimed in claim 1, wherein said first reactant is at least one selected from the group consisting of diethyl ether, ethyl acetate and ethylene carbonate.

8. Process as claimed in claim 6, wherein said $n$ is up to about 6.

9. Process as claimed in claim 1, wherein said acyloxylated product is subjected to pyrolytic deacyloxylation, whereby a compound of the formula:

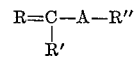

is formed.

10. Process as claimed in claim 9, wherein said product is vinyl acetate.

11. Process as claimed in claim 1, wherein R'' is acetyl.

References Cited

UNITED STATES PATENTS 3,252,876   5/1966   Koehl _____ 204—59
2,252,877   5/1966   Koehl _____ 204—59

HOWARD S. WILLIAMS, *Primary Examiner.*

H. M. FLOURNOY, *Assistant Examiner.*

PO-1050
(5/69)

UNITED STATES PATENT OFFICE
CERTIFICATE OF CORRECTION

Patent No. 3,453,188   Dated  July 1, 1969

Inventor(s)  ARTHUR M. BROWNSTEIN

It is certified that error appears in the above-identified patent and that said Letters Patent are hereby corrected as shown below:

Column 1, line 67, "anosole" should be --anisole--; column 2, line 22, in the structural formula, the lower portion should read

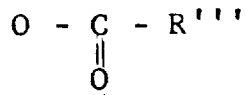

SIGNED AND
SEALED

MAR 3 - 1970

(SEAL)
Attest:

Edward M. Fletcher, Jr.
Attesting Officer

WILLIAM E. SCHUYLER, JR.
Commissioner of Patents